Patented July 15, 1924.

1,501,108

UNITED STATES PATENT OFFICE.

VICTOR C. HAMISTER, OF CLEVELAND, OHIO, ASSIGNOR, BY MESNE ASSIGNMENTS, TO NATIONAL CARBON COMPANY, INC., OF NEW YORK, N. Y., A CORPORATION OF NEW YORK.

PROCESS OF CALCINING CARBON AND PRODUCTS THEREOF.

No Drawing.    Application filed July 15, 1921.    Serial No. 485,065.

*To all whom it may concern:*

Be it known that I, VICTOR C. HAMISTER, a citizen of the United States, residing at Cleveland, in the county of Cuyahoga and State of Ohio, have invented certain new and useful Improvements in Processes of Calcining Carbon and Products Thereof, of which the following is a specification.

In manufacturing formed carbon articles, such as brushes, electrodes and the like for the electrical industry, the raw material is usually a material of high carbon content and very low ash, for example lampblack or gas-black having an ash content of less than 0.20%. In order to impart to such material the requisite electrical conductivity and density, it is necessary to subject the material to a calcining operation, and it is found advantageous to mix the powdered material with a carbonaceous binder, such as tar, before calcining it. The carbonaceous residue of the binder will of course remain in the calcined material.

As now commonly conducted, calcination is carried out as follows. The lamp- or gas-black is mixed with tar and formed into briquets. These are charged into large hearth furnaces or other equivalent stationary furnaces and heated at very gradually increasing temperatures until 1000° C. more or less is attained. After maintaining the briquets at the maximum temperature for a sufficient time, the furnace is gradually cooled and the briquets eventually removed and ground, and the carbon flour so obtained made up into shaped articles. The calcining operation ordinarily consumes several weeks and the costs for fuel and attendance are enormous. Furthermore, a very large amount of material is continually in process. The object of the present invention is an improved process for calcining lampblack and like low-ash material, and a product having properties in many respects superior to those of the product obtained by the process described above. For convenience, the described process of the prior art is referred to herein as the briquetting process.

I have discovered that comminuted carbonaceous material may be calcined very effectively in a process which may be continuous and which permits the use of substantially lower temperatures and very much shorter times than do the processes of the prior art. Briquetting of the material, as a separate and distinct step, may be dispensed with and a superior product nevertheless obtained. The novel process of my invention is illustrated by the following specific example:

One hundred thirty-five pounds of raw lampblack is mixed with 180 pounds of light coal tar to form a plastic mass. This is fed, preferably continuously, to a rotating tubular, externally-fired furnace where its temperature is progressively increased with the progressive expulsion of the volatile substances present. By the time a temperature of 300° C. is reached, the expulsion of volatile matter and the tumbling action brought about by the rotation of the tube have reduced the material to the form of hard, rounded, partially coked nodules which may vary in diameter from $\frac{1}{8}$ inch to $\frac{1}{2}$ inch or more. With further increase of temperature to a red heat, the nodules experience no change in form, but additional volatile matter is expelled. The final temperature may be 500° C. to 900° C., depending on the properties which it is desired to impart to the material. Good results have been obtained with a final temperature of 700° C. The hot nodulized material is discharged and protected from oxidation until it is sufficiently cooled, after which it may be ground and treated in a manner similar to that employed in connection with the ground briquets of the prior art referred to.

No special apparatus is required, the process being carried out in rotary heating apparatus of common type. If desired, two or more rotary heaters may be used, the low-temperature stage of the heating being performed in simpler and cheaper apparatus which need not be adapted to withstand high temperatures. The volatile matter distilled off during the heating may be recovered, and liquid constituents may be condensed therefrom. Feed, discharge and other accessory mechanism may be of any suitable and usual kind.

As compared with the standard briquetting process of calcination, the process of my invention exhibits striking economies. The period from the feeding of the lampblack-tar mix until the calcined nodulized material is ready for grinding may be as little as three hours, so that the amount of material in process is inconsiderable as compared with that required by the briquetting process of calcination.

Moreover, the product is decidedly superior to that of the briquetting process. While its real density is somewhat less, the apparent density of the product of rotary calcination is greater, showing a smaller porosity. Because of the smaller porosity, less binder may be used in preparing the final mixture from which electrodes and other articles are to be made. The shrinkage during the baking of the electrodes is greater with the product of my invention than with the product of briquetting calcination, but the finished electrodes are harder and when used in the arc-lamp they spindle less, due to the fact that they do not conduct the heat of the arc so readily. Tests with electrodes made from the new material show that they have a longer life than electrodes made from standard flour, while they are equal to the latter in quality of light and steadiness of the arc. The following table serves to exhibit some of the qualities of electrodes prepared from the product of my invention as compared with electrodes made from the product of briquetting calcination:

| | Materials. | Maximum temperature of calcination. | Yield. | Apparent density of powder in bulk. | Real density of powder. | Calculated porosity. | Mixture for electrodes. | Shrinkage during baking of electrodes. | Apparent density of electrodes. | Hardness. | Modulus of rupture. | Specific resistance per inch cube. | Spindle on burning test. |
|---|---|---|---|---|---|---|---|---|---|---|---|---|---|
| Briquetting process. | 135 lbs. raw lampblack; 180 lbs. light tar. | 1000° C. | 50% | 0.52 | 1.83 | 52% | 260 lbs. carbon flour; 161 lbs. coal tar. | Length. 4.7% Diameter 3.9% | 1.35 | 73 | Lbs. per sq. in. 4,600 | Ohms. 0.0028 | Inch. 0.95 |
| Nodulizing process. | 135 lbs. raw lampblack; 180 lbs. light tar. | 700°C. | 63% | 0.613 | 1.64 | 40% | 260 lbs. carbon flour; 148 lbs. coal tar. | Length. 7.7% Diameter 5.3% | 1.45 | 82 | 4,600 | 0.0028 | 0.74 |

In calculating the porosity of the powder, 40% of interstitial voids was assumed.

I claim:—

1. Process of calcining lampblack or like low-ash material, which comprises mixing the material with a fluid carbonizable binder to form a plastic mass, heating and tumbling the mixture under conditions adapted to expel volatile matter and form hard rounded nodules, and then heating the nodulized material to a red heat while tumbling it to expel additional volatile matter.

2. In the process of calcining lampblack or like low-ash material, the steps of mixing the material with a fluid carbonizable binder to form a plastic mass, and heating and tumbling the mixture under conditions adapted to expel all matter volatile at a red heat and form hard rounded nodules.

3. Process of calcining lampblack or like low-ash material, which comprises mixing the material with a tar binder to form a plastic mass, heating and tumbling the mixture under conditions adapted to expel volatile matter and form hard rounded nodules, and then heating the nodulized material to a red heat while tumbling it to expel additional volatile matter.

4. Process of calcining lampblack or like low-ash material, which comprises mixing the material with a fluid carbonizable binder to form a plastic mass, heating and tumbling the mixture under conditions adapted to expel volatile matter and form hard rounded nodules, and then heating the nodulized material, while tumbling it, to a temperature in excess of 500° C. to expel additional volatile matter.

5. Process of calcining lampblack or like low-ash material, which comprises mixing the material with a fluid carbonizable binder to form a plastic mass, heating and tumbling the mixture under conditions adapted to expel volatile matter and form hard rounded nodules, and then heating the nodulized material, while tumbling it, to a temperature between 600° C. and 850° C. to expel additional volatile matter.

6. Process of making carbon flour, which comprises mixing lampblack or like low-ash material with a fluid carbonizable binder to form a plastic mass, heating and tumbling the mixture under conditions adapted to expel volatile matter and form hard rounded nodules, then heating the nodulized material to a red heat while tumbling it to expel additional volatile matter, and then grinding the nodulized material to flour.

7. Process of making carbon flour, which comprises mixing lampblack or like low-ash material with a tar binder to form a plastic mass, heating and tumbling the mixture under conditions adapted to expel volatile matter and form hard rounded nodules, then heating the nodulized material to a red heat while tumbling it to expel additional volatile matter, and then grinding the nodulized material to flour.

8. Process of making carbon flour, which comprises mixing lampblack or like low-ash material with a fluid carbonizable binder to form a plastic mass, heating and tumbling the mixture under conditions adapted to expel volatile matter and form hard rounded nodules, then heating the nodulized material, while tumbling it, to a temperature in excess of 500° C. to expel additional volatile matter, and then grinding the nodulized material to flour.

9. Process of making carbon flour, which comprises mixing lampblack or like low-ash material with a fluid carbonizable binder to form a plastic mass, heating and tumbling the mixture under conditions adapted to expel volatile matter and form hard rounded nodules, then heating the nodulized material, while tumbling it, to a temperature between 600° C. and 850° C. to expel additional volatile matter, and then grinding the nodulized material to flour.

10. Process of making carbon flour, which comprises forming hard rounded nodules from lampblack or like low-ash material, said nodules being free from matter volatile at a red heat, and then grinding the nodules to flour.

11. Process of making carbon flour, which comprises forming hard rounded nodules from lampblack or like low-ash material, heating the nodulized material to a temperature in excess of 500° C. and then grinding the nodulized material to flour.

12. As a new article of manufacture, carbon in the form of hard nodules having an ash content of less than 0.20%.

13. As a new article of manufacture, carbon in the form of hard nodules having an ash content of less than 0.20%, the nodules having an average diameter greater than ⅛th inch.

14. As a new article of manufacture, carbon in the form of hard nodules and capable of giving, on grinding, a carbon flour adapted by its ash content and other properties for use in making arc-lamp electrodes and the like.

15. As a new article of manufacture, carbon in the form of hard nodules having an average diameter greater than ⅛th inch and capable of giving, on grinding, a carbon flour adapted by its ash content and other properties for use in making arc-lamp electrodes and the like.

16. As a new article of manufacture, carbon flour having an ash content of less than 0.20% and a porosity of less than 40%.

In testimony whereof, I affix my signature.

VICTOR C. HAMISTER.